United States Patent
Lehtinen

(10) Patent No.: US 7,444,635 B2
(45) Date of Patent: Oct. 28, 2008

(54) MULTI-TASK SYSTEM FOR CONTROLLING EXECUTION OF APPLICATION SESSIONS AND RESERVATION OF RESOURCES

(75) Inventor: Pekka Lehtinen, Järvenpää (FI)

(73) Assignee: Nokia Corporation, Espoo (FI)

( * ) Notice: Subject to any disclaimer, the term of this patent is extended or adjusted under 35 U.S.C. 154(b) by 880 days.

(21) Appl. No.: 10/601,066

(22) Filed: Jun. 20, 2003

(65) Prior Publication Data

US 2004/0040025 A1 Feb. 26, 2004

(30) Foreign Application Priority Data

Jun. 20, 2002 (FI) ................................. 20021204

(51) Int. Cl.
*G06F 9/46* (2006.01)
(52) U.S. Cl. .................. 718/104; 718/102; 718/105
(58) Field of Classification Search ................. 718/104, 718/1, 100, 102, 103, 105; 709/227, 228, 709/223, 224
See application file for complete search history.

(56) References Cited

U.S. PATENT DOCUMENTS

| | | | | |
|---|---|---|---|---|
| 6,026,427 | A * | 2/2000 | Nishihara et al. | 718/106 |
| 6,208,633 | B1 * | 3/2001 | Jouppila et al. | 370/338 |
| 6,453,316 | B1 * | 9/2002 | Karibe et al. | 707/8 |
| 6,771,661 | B1 * | 8/2004 | Chawla et al. | 370/468 |
| 6,876,668 | B1 * | 4/2005 | Chawla et al. | 370/468 |
| 7,140,020 | B2 * | 11/2006 | McCarthy et al. | 718/104 |
| 2001/0029519 | A1 * | 10/2001 | Hallinan et al. | 709/104 |
| 2002/0065953 | A1 * | 5/2002 | Alford et al. | 709/328 |
| 2004/0172464 | A1 * | 9/2004 | Nag | 709/223 |

FOREIGN PATENT DOCUMENTS

| | | |
|---|---|---|
| EP | 0 953 905 | 11/1999 |
| EP | 0953905 | 11/1999 |
| EP | 0 978 781 | 2/2000 |
| EP | 1 037 147 | 9/2000 |
| JP | 09-305268 | * 11/1997 |
| WO | 9946679 | 9/1999 |
| WO | 01/57650 | 9/2001 |
| WO | 01/86415 | 11/2001 |

* cited by examiner

*Primary Examiner*—Meng-Ai An
*Assistant Examiner*—Abdullah Al Kawsar

(57) ABSTRACT

Resource type specific Resource Handlers are provided for the reservation of resources for an application session, along with a Resource Allocation Manager for bookkeeping and analysis of a resource allocation situation, Application Session Management and Scheduling means for selecting a next application session and Activity Block at least on the basis of the resource allocation situation, and executing means for executing the Activity Block in the course of the selected application session. A system is provided with a protocol connecting said Resource Handlers, Resource Allocation Manager, Application Session Management and Scheduling means, and executing means to control the execution order and to implement the transfer of information between the resource reservation means, Resource Allocation Manager, Application Session Management and Scheduling means, and executing means. Also provided is a method for the execution of application sessions in an electronic device, as well as to an electronic device.

24 Claims, 4 Drawing Sheets

US 7,444,635 B2

MULTI-TASK SYSTEM FOR CONTROLLING EXECUTION OF APPLICATION SESSIONS AND RESERVATION OF RESOURCES

CROSS-REFERENCE TO RELATED APPLICATIONS

This application claims priority under 35 USC §119 to Finnish Patent Application No. 20021204 filed on Jun. 20, 2002.

FIELD OF THE INVENTION

The current invention relates to a system comprising means for executing application sessions in an electronic device equipped with one or more processors and means for scheduling resource reservations and the execution of substantially simultaneous application sessions. The invention also relates to a method for executing application sessions in an electronic device in which the operation is controlled by one or more processors, with resource reservations and the execution of substantially simultaneous application sessions being scheduled in this method. Furthermore, the invention relates to an electronic device comprising means for executing application sessions, one or more processors, and means for scheduling resource reservations as well as the processing of substantially simultaneous application sessions. Furthermore, the invention relates to a software program comprising machine executable steps for executing application sessions in an electronic device with one or more processors for synchronizing Resource Reservation Instances as well as the execution of substantially simultaneous application sessions As the capabilities of wireless communication devices get more and more rich, there is a need to develop systems for utilizing these capabilities in a sensible and versatile way. In modern wireless communication devices, it is even possible to execute several application sessions with different objectives, such as a calendar, a timer, a telephone directory, a notepad, etc. It may often be necessary to run several such sessions substantially simultaneously, wherein problems may occur, for example, when different sessions would require the same resources of the wireless communication device itself or resources available via various connections, at the same time. For example, there are operating systems which are intended for data processing devices, such as UNIX®, implementing a multi-task method, i.e. the processing of several Operating System tasks substantially simultaneously. Such a multi-task method is implemented, for example, in such a way that each session is implemented in the form of a single software process and the operating system allocates processing time to each process in a given order. Thus, during the execution of one session, the other sessions are in a suspension state. Consequently, in practice, the sessions are not executed simultaneously but one after the other. However, the processing time allocated to each session at a time is so short that there is a feeling of all the sessions being executed simultaneously. In such an arrangement, none of the sessions normally needs to wait for so long a time that the execution of the session would seem to be interrupted. However, in a situation in which the number of sessions executed simultaneously is increased, less and less processor time is left for each session, which will slow down the execution of all the sessions. In some systems, it is possible to classify the sessions in accordance with their importance (prioritization), wherein the sessions are allocated processor time according to their priorities. In this arrangement, the execution of less important sessions may be significantly delayed.

BACKGROUND OF THE INVENTION

Multi-task systems of the prior art have also incorporated the problem that if any session requires a hardware resource and/or an operating system resource, this session will reserve the resource for as long a time as is required for the use of the resource. Thus, other sessions that would need the same resource must wait for the release of this resource, because there is normally no such method by which the resource could be transferred from one session to another in such a way that this resource availability situation would be known to each session involved. For such situations, some solutions have been developed, in which the operating system uses semaphores, or the like, to prevent the use of a reserved resource from other sessions requesting the same resource.

The execution of several application sessions in wireless communication devices should be as close to real time operation as possible, for example, in view of the convenience of using a wireless device. For example, when initiating a call, a telephone directory session should be executed as quickly as possible so that the user of the wireless communication device would find the required telephone number without an undesirable delay. However, this kind of real-time operation may be difficult to implement, particularly when there is a large number of sessions to be executed simultaneously in the wireless communication device. One known solution to meet the demands of multi-task and real time processing is to make use of several processors in the same device. Thus, different sessions can be executed by different processors. However, this involves e.g. the drawback that when the number of processors is increased, the power consumption of the device is also increased, which should be avoided particularly in portable devices. Furthermore, in systems with several processors, arrangements are needed, whereby different application sessions are allocated to be executed by different processors.

For embedded applications, multi-task systems have been developed, in which the execution of different sessions can be scheduled, and each session can be allocated processing time when necessary. However, such embedded applications are designed for specific purposes only, wherein it is largely possible to determine in advance, which sessions are to be executed under different conditions and which resources will be needed at each time. In this case, the scheduling of the sessions can be determined in advance. In addition, these applications do not include an operating system. Such multi-task systems are not suitable for use in wireless communication devices, in which it is not possible to determine, in advance, all the different use cases and the related resource needs.

Considerable problems in multi-task systems include the management and scheduling of resource reservations as well as the management and scheduling of application sessions, in other words, the synchronization of the allocation of the processor and other types of resources, to meet the demands of different sessions. However, these problems cannot be solved separately, wherein it is difficult to find suitable solutions for both problems.

SUMMARY OF THE INVENTION

One objective of the current invention is to provide an improved arrangement particularly for wireless communication devices to implement a multi-task system which operates as close to real time as possible. The invention is based on the idea of specifying a session execution environment that includes different functional blocks for controlling the execution of application sessions and the reservation of resources. A central one among these functional blocks is the management of application sessions and resources, that is divided into e.g. an application session management and scheduling block (also called as Application Session Manager, ASM) and a resource management and allocation block (also called as Resource Allocation Manager, RAM). The application session to be executed is divided into successive and parallel activities which are implemented in the form of corresponding application blocks, which in this description of the current invention are called activity blocks. The application session manager ASM is responsible for the scheduling (e.g. initiating) of the activities of each session one by one, e.g. on the basis of the resources available. The Resource Allocation Manager RAM is responsible for all the centralized management and synchronization functions related to the different resource types and resources, for example, by keeping a record of individual resource reservations and informing the Application Session Manager accordingly. An essential feature in the operation of the system according to the current invention is the relative scheduling of the Application Session Manager and the Resource Allocation Manager, that is implemented in such a way that substantially immediately after each execution turn of the Resource Allocation Manager, when the resource allocation situation of at least some resources is stable (i.e. as up-to-date as possible), actions of the Application Session Manager are executed. Other Functional Blocks of the system include, for example, Resource Handlers RH for each resource type, as well as Activity Block Containers ABC. The Resource Handlers maintain so called Resource Instance Records RIR of individual allocations of the respective resource types in their Resource Instance Tables RIT. Each Activity Block Container preferably contains such Activity Blocks of one or more sessions, that are normally executed successively without a need for parallel processing. The Resource Handlers can be ideally implemented as software processes which have priorities on a higher level than the Resource Allocation Manager, wherein the Resource Allocation Manager receives the processor from the Operating System in a situation when the Resource Handlers have processed both their application- and resource-originated messages, and the resource allocation situation is temporarily unambiguously known, at least concerning some resources. Another functional characteristic of the invention is a Session Control Protocol SCP that is applied e.g. for the transmission of messages between different parts of the system (i.e. members of an application session).

To put it more precisely, the system of the current invention can be primarily characterized in that the application session to be executed comprises one or more Activity Blocks in one or more Activity Block Containers, and an execution order is specified for said Activity Blocks; that the system comprises resource type specific Resource Handlers for reserving resources for the application session, Resource Allocation Manager for analysing and saving the resource allocation situation, Application Session Management and Scheduling means for selecting at least the next application session and Activity Block to be executed on the basis of said resource allocation situation, executing means for executing the next Activity Block in the course of the selected application session, and the system is provided with a protocol connecting the Resource Handlers, Resource Allocation Manager, Application Session Management and Scheduling means and executing means, to control the execution order and to implement the transfer of information between said Resource Handlers, Resource Allocation Manager, Application Session Management and Scheduling means, and executing means.

The method of the current invention can be primarily characterized by that the application session to be executed comprises one or more Activity Blocks in one or more Activity Block Containers, and the execution order is determined for said Activity Blocks; that the method comprises at least the following steps:
   a resource management and allocation step for requesting and reserving resources to the application session,
   a bookkeeping and analysis step for saving and analysing the resource reservation situation,
   a scheduling and selection step for selecting the next application session and Activity Block to be executed at least on the basis of said resource reservation situation,
   an execution step for executing the next Activity Block in the course of the selected application session, wherein in the method, a communication protocol connecting said resource management and allocation step, bookkeeping and analysis step, scheduling and selection step, and the execution step is used to control the execution order and, if necessary, to transfer information between said resource management and allocation step, bookkeeping and analysis step, scheduling and selection step, and execution step.

Furthermore, the electronic device of the current invention can be primarily characterized in that the application session to be executed comprises one or more Activity Blocks in one or more Activity Block Containers, and an execution order is determined for said Activity Blocks; that the electronic device comprises resource type specific Resource Handlers for reserving resources for the application session, Resource Allocation Manager for analysing and saving a resource allocation situation, Application Session Management and Scheduling means for selecting at least the next application session and Activity Block to be executed on the basis of said resource allocation situation, executing means for executing the next Activity Block in the course of the selected application session; and the electronic device is provided with a protocol connecting the Resource Handlers, Resource Allocation Manager, Application Session Management and Scheduling means and executing means, to control the execution order and to implement the transfer of information between said Resource Handlers, Resource Allocation Manager, Application Session Management and Scheduling means, and executing means.

The software program of the current invention can be primarily characterized in that the application session to be executed comprises one or more Activity Blocks in one or more Activity Block Containers, and an execution order is determined for said Activity Blocks, that the software program further comprises machine executable steps for performing at least the following steps:
   a resource management and allocation step for requesting and reserving resources for the application session,
   a bookkeeping and analysis step for saving and analysing the resource reservation situation,
   a scheduling and selection step for selecting the next application session and Activity Block to be executed at least on the basis of said resource reservation situation,
   an execution step for executing the next Activity Block in the course of the selected application session, wherein in the software program comprises machine executable steps for using a communication protocol connecting said resource management and allocation step, bookkeeping and analysis step, scheduling and selection step, and the execution step to control the execution order and, if necessary, to transfer information between said resource management and allocation step, bookkeeping and analysis step, scheduling and selection step, and execution step.

The current invention shows remarkable advantages over solution methods of the prior art. By the method of the invention, one session does not necessarily reserve a resource facility entirely for itself and not necessarily for the entire duration of the session, wherein it is possible to allocate resources substantially simultaneously (i.e. in parallel) to more than one session and also to synchronize the reservation times of the simultaneously required resources of each session as optimally as possible. The utilization of the resources and the processor during the execution of the sessions can be efficiently implemented in the system of the invention, assuming that the Application Session Manager is furnished with the sufficient control intelligence for scheduling. By the method of the invention, it is possible to manage overload conditions and to avoid the occurrence of deadlocks. During overload conditions, it is possible to suspend ongoing application sessions in accordance with their priorities, and to delay the initiation of new application sessions. This applies to overload conditions of other shared resources as well, and not only processor overload conditions. According to the invention, the Session Control Protocol SCP and the prioritization rule of the software processes (OS tasks) of different functions enable the scheduling and synchronization control of the operations involved in an application session even in processor overload conditions, wherein several software processes (OS tasks) may have several unhandled messages at the same time. The order of processing messages which are unhandled at the same time is determined according to the prioritization principle of the software processes (OS tasks) participating in the application session in accordance with the normal task switching mode of the Operating System. Furthermore, the arrangement of the invention has the advantage that the power consumption of a Wireless Communication Device can be reduced in situations in which the load level is so low that the processor can operate with a reduced power level. The Application Session Manager ASM enables the detection of load conditions that are different from the viewpoint of the power consumption for control purposes. The software architecture of the invention offers a solid software environment, wherein the design of each Activity Block for the Wireless Communication Device is as uniform as possible, independently of the individual activity involved and the complexity of the related application session. Furthermore, the structuring of each application session into Activity Blocks makes it possible that the software development work needed for implementing the application can be easily realized by dividing the application session into separate activities, each one in the form of an Activity Block. The Application Framework offered by the Activity Block Containers can be designed to include the sending and reception of the generic SCP messages of all the parallel application sessions without a need for the application designer to be aware of the presence of the Session Control Protocol, the Application Session Manager, or the Resource Allocation Manager. In software development based on the Activity Blocks of the software architecture of the invention, it is possible to utilize powerful software development tools and to efficiently re-use both the Activity Blocks and the SCP-based behavioural pattern integrating these blocks in accordance with an Application Session Profile. In the architecture of the invention, the Application Session Manager is responsible for the initiation of the execution of each Activity Block at an appropriate time.

BRIEF DESCRIPTION OF THE DRAWINGS

In the following, the invention will be described in more detail with references to the appended drawings, in which.

DETAILED DESCRIPTION OF THE INVENTION

In the following, the invention will be described in such respects that the functions needed for implementing the invention will be disclosed. However, even though the various functionality of the system will be described in the following in a blockwise manner, it is obvious that several Functional Blocks co-operate to carry out several different functions by means of the Session Control Protocol.

Figure 1:
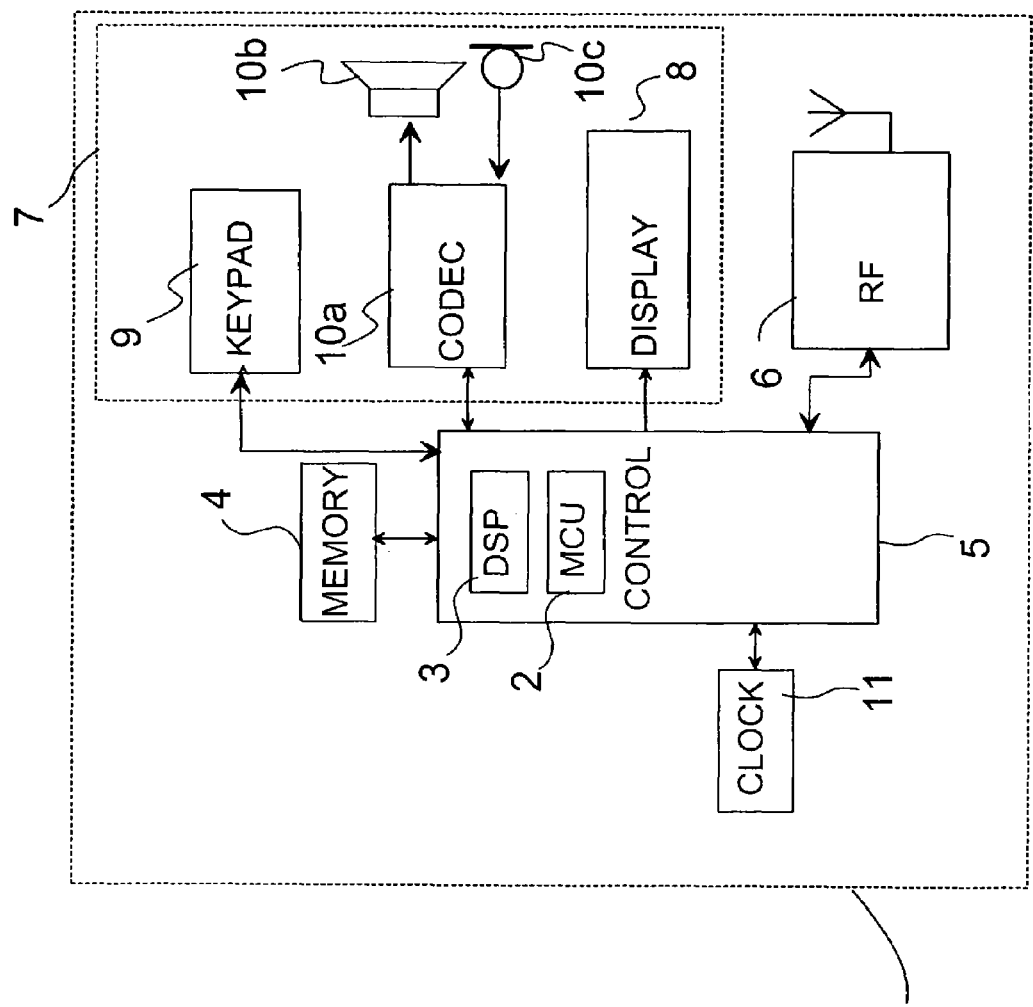
FIG. 1 shows a Wireless Communication Device corresponding to a preferred embodiment of the invention in the form of a simplified block diagram, FIG. 2 outlines a system corresponding to a preferred embodiment of the invention, FIG. 3 outlines the functional structure of an Activity Block Container implemented in a system corresponding to a preferable embodiment of the invention.

FIG. 1 shows a simplified block diagram of a Wireless Communication Device 1, in compliance with a preferred embodiment of the invention. The Wireless Communication Device 1 comprises a Control Block 5 with preferably a Master Control Unit processor 2 (MCU) for controlling the functions of the Wireless Communication Device 1, for executing Operating System routines, etc. Furthermore, the Control Block 5 of the Wireless Communication Device 1 may include a Digital Signal Processor 3 (DSP) for signal processing functions. Processor 2 (MCU) and the Digital Signal Processor 3 (DSP) are also associated with a Memory Device 4 for storing information and data needed by the Operating System, the program code, etc. The Wireless Communication Device 1 also comprises a Communication Device 6, including means for performing the functions of a mobile phone. The information exchange between the user and the Wireless Communication Device 1 can take place via the User Interface 7 that preferably comprises a Display Device 8, a Keypad 9, and Audio Devices 10a, 10b, 10c. It should be evident that the Wireless Communication Device 1 described above is only a simplified example, and in practice, the Wireless Communication Device 1 may also comprise other Functional Blocks than those presented above. It is also true, that the Digital Signal Processor 3 is not necessarily needed in the Wireless Communication Device according to the invention, wherein the required signal processing functions are implemented in other blocks. In addition, the Wireless Communication Device 1 comprises a Clock Circuit 11 or the like, for example to generate the clock signals required for the functioning of the Control Block.

Figure 2:
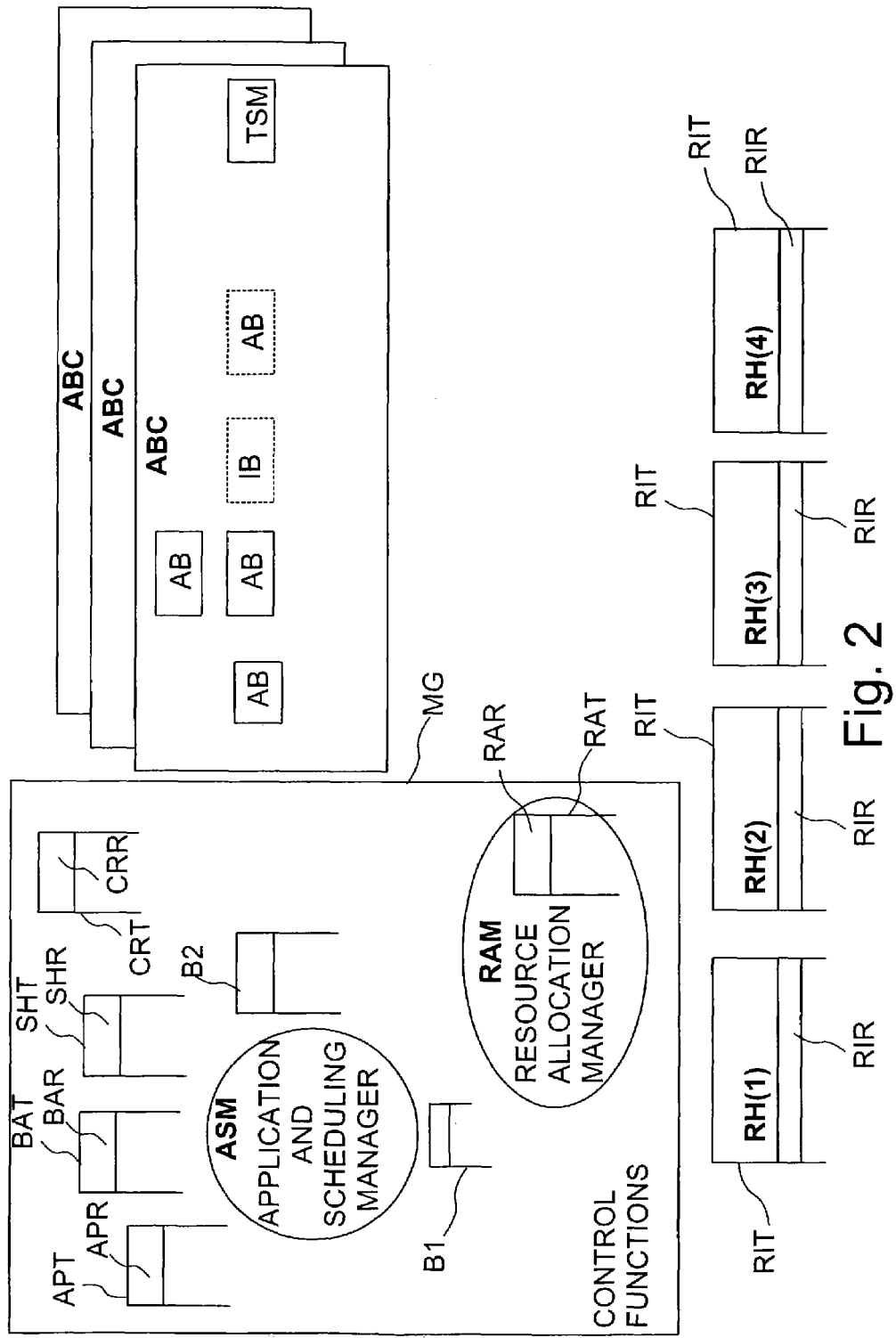

FIG. 2 shows simplified Functional Blocks of a system that is in accordance with a preferred embodiment of the invention. This system constitutes a kind of a control architecture for supervising the functions of software processes (OS tasks) involved in the execution of application sessions and the use of resources of a wireless terminal. A software process (OS task) refers to a software entity that can be scheduled independently in view of the task switching function of the Operating System. There are several resources and resource types for different uses. Some examples of these resources are to be mentioned here briefly: various functions of the User Interface 7, such as presenting data on the Display Device 8, retrieval of data from the Keypad 9, processing functions of audio signals; data transmission functions including the reception and generation of various messages and the generation of response messages; signal processing functions; stacks of protocol software; and other application sessions. In the system, the Memory Device 4 also includes, e.g. a Message Buffer B1 for all the messages that are transmitted by Resource Handlers RH(i), RH(j), RH(k), etc. to the Application Session Manager ASM, as well as another Message Buffer B2 particularly for holding session initiation request messages. The Memory Device 4 of the system also includes, e.g. memory space for holding a Resource Allocation Table RAT. It is obvious that in practical applications of the invention, also other (dynamic and/or fixed) memory areas can be reserved in the Memory Device 4 for different purposes.

The functionality of the system can be divided into three main activities: Admission Control AC, Suspension Control SC, and Resource Reservation Control RRC. The Admission Control is used to restrict the activation of the first Activity Block Container of the Application Session Profile of each new session, taking into account the current load condition and resource reservation situation. The Suspension Control regulates the eventual suspension of the execution of individual ongoing sessions at the end point of each Activity Block either temporarily or permanently according to the resource reservation situation. The Resource Reservation Control is used for bookkeeping of the resource requests made by Activity Blocks of the application sessions as well as the existing resource reservations at each time, in order to provide this information to the Application Session Manager.

To implement the above-mentioned basic functionality, some Functional Blocks are specified to be included in the system.

A central one among these Functional Blocks of the system is the management of the application sessions and resources MG, that is divided, e.g. into an Application Session Manager ASM and a Resource Allocation Manager RAM. The Application Session Manager ASM is responsible, e.g. for the admission and scheduling the initiation of sessions, scheduling the initiation of the execution of individual activities included in ongoing sessions, and similar functions that are independent of applications. A more detailed description of the functions of this block and also other blocks of the system will be presented later in this specification. For the purpose of resource management and bookkeeping of the resource allocation situation, the system includes resource-type-specific Resource Handlers RH(i) as well as a Resource Allocation Manager RAM. The activities included in the Application Session Profiles are implemented in the form of Activity Blocks which are distributed into Activity Block Containers ABC in an appropriate manner from the viewpoint of the capacity performance of the system, each of them containing Activity Blocks AB of one or more sessions. An individual Activity Block AB may be included in different sessions when processed at different times. Furthermore, a Session Control Protocol SCP is specified for the system to control the initiation of the execution of the Activity Blocks of the session, as will be described later in this application. Although the description of the system is composed of separate Functional Blocks in FIG. 2, each block is, in practice, preferably implemented in the form of program code of the Processor 2, containing the stepwise code needed in the functioning of these blocks. The operation of the system is under the task switching control exercised by the Operating System, or the like, which in accordance with a prioritization scheme allocates processor time to the software processes (OS tasks) that comprise all the program codes of the system.

The term session (application session) used in this application may not be interpreted in a restricted manner, but a session may be, for example, a simple list of program code comprising a single activity in the form of a single Activity Block, or a session may comprise a set of separate program modules or the like which can be arranged into one or more Activity Blocks. A session may also be dependent on other sessions, for example if one application session initiates another application session to obtain some required information from the latter one. An application session can also be called an application. As non-restrictive examples of sessions executed in a Wireless Communication Device, one can give a calendar, a telephone directory, answering to an incoming call, creation and transmission of short text messages, reception and reading of short text messages, etc. In the present invention, each session is defined in such a way that it is composed of one or more activities. The ordering of the execution of the Activity Blocks of these activities may be fixed, or the Application Session Manager ASM may, in the course of a session, determine which Activity Block is the next one to be executed. This selection depends, for example, on the completion of the preceding Activity Block or the occurrence of a given event, the arrival of an unexpected signal, etc. The Activity Blocks of the same session can be located in, for example, a single Activity Block Container, if the session does not include activities that are to be executed in parallel.

The parallel ongoing application sessions comprise a set of successive and/or parallel activities, the respective Activity Blocks being located and executed in one or more Activity Block Containers, depending on the required parallelism. For example, in the case of an incoming call, a set of sessions are started one after another, to provide information of the incoming call, to retrieve the name and data of the calling party from the telephone directory of the Wireless Communication Device on the basis of the calling number, and to display the name of the calling party on the display of the Wireless Communication Device, and to wait for the user of the Wireless Communication Device to answer to the incoming call, in other words, preferably to stay waiting for eventual keystrokes. If the user presses, for example, the handset key, the keystroke is interpreted to decide on further activity, such as answering the call. The different functional phases of the above-mentioned example scenario can be implemented in the form of separate application sessions or different individual activities of a single session. Each one of said activities can be seen as a kind of application session. Within one session, however, the reservation and vacation of resources needed by the Activity Blocks of different activities is more flexible than it would be if the activities were specified to be separate application sessions.

In the following, the primary activities of the central Functional Blocks will be described. The Application Session Manager ASM is responsible for the mutual synchronization (scheduling) of the execution of parallel application sessions, and the Activity Blocks included in these sessions, that is, providing the required control for the allocation and scheduling of processor time and other resources to each Activity Block. The Application Session Manager ASM is also responsible for reading Application Session Profiles ASP from an Application Profile Table APT. The Application Profile Table APT contains information, in the form of a kind of Activity Diagram, about the mutual precedence relationships of the successive and parallel Activity Blocks of the session (i.e., activities included in the session). On the basis of this Application Session Profile, the Application Session Manager ASM knows how the execution of the session shall proceed from one Activity Block to another. For the same application, it is also possible to specify more than one Application Session Profile, for example, for two different use cases, for example during working hours and leisure time. It should be noted that the same Activity Block can be included in several different Application Session Profiles. For example, it is possible to start several sessions of the same application at different times, the Application Session Profile being each time different with respect to some activities. Thus, Activity Blocks of the same Activity Block Container can be included and executed within different sessions without a need to provide a copy of these blocks for each session. This yields, for example, the benefit of reducing the size of the Memory Device 4 needed. Preferably in connection with the initiation, each application session is assigned e.g. a priority value that can be used as an urgency criterion when controlling the execution order and possible suspension of individual sessions processed in parallel. In addition, the estimated processing time and the resources required by each Activity Block are preferably defined for the Activity Blocks of each session. This information can be used by the Application Session Manager ASM for controlling the scheduling of the Activity Blocks and for the analysis of the resource allocation situation, particularly at the time of overload conditions. The Application and Session Manager ASM has access to a Block Assignment Table BAT of the Activity Blocks AB, containing a list of the Activity Blocks in each Activity Block Container and information of those blocks that are currently being processed in ongoing sessions. This data is stored in Block Assignment Records BAR in the BAT.

In addition, the Application Session Manager ASM can be provided information about the resources needed by each Activity Block, either conditional or unconditional, in the Application Profile Table APT that contains Application Profile Records APR. If an Application Session Profile does not contain information of all the resources needed in the session, this information is acquired when the Activity Blocks generate Reservation Request messages to the Resource Handlers and the Resource Allocation Manager.

The Application Session Manager ASM preferably stores history data of each session executed. For this purpose, the system preferably includes a Session History Table SHT comprising Session History Records SHR in which the Application Session Manager ASM saves trace data of each ongoing session, thus preferably maintaining information that is transferred as output information from each Activity Block to the succeeding blocks.

The Application Session Manager ASM receives the initial Session Request messages appearing at the initiation of each new session so that the Application Session Manager ASM can analyse the load condition and also supervise the scheduling of the initiation of the activities included in the new session. Particularly at the time of an overload condition of the processor or other resources, the Application Session Manager ASM is responsible for deciding whether the requested session can be started or not. When making this decision, the Application Session Manager ASM preferably utilizes the processing time estimates of the Activity Blocks, and the related resource reservation time estimates, and possibly some other data to analyse if the more important previously started sessions can meet their real time requirements also after the initiation of the new session. With such an arrangement, it is possible to manage overload conditions largely preventing them in advance. The Application Session Manager ASM also maneuvers a temporary suspension of an application session at the completion of an Activity Block, for example, when the same reserved resource is needed for the execution of some activity in a more urgent session or when a required resource is entirely engaged up to the completion of some currently processed Activity Blocks. In practice, the suspension of a session can be instrumented so that after the end of the preceding Activity Block, the Application Session Manager ASM does not transmit an Inward Control message (Do message) to the Activity Block Container that contains the next Activity Block of the session until this same session can be given processor time. In some cases, an Application Session Profile may contain Activity Blocks that are intended to be executed in parallel, which is enabled by locating these blocks in different Activity Block Containers. If the above-mentioned suspension point is precedent to the start of the Activity Blocks of parallel activities of this kind, the Inward Control message is not transmitted for any of these Activity Blocks until the execution of the session can be continued.

It is also the responsibility of the Application Session Manager ASM to convey incoming messages from any Resource Handler in the correct order to the right Activity Blocks in selected Activity Block Containers in a situation when no Activity Block is synchronously waiting for this incoming message. This is useful particularly in the case of asynchronous message transmission in a situation, in which the capacity of the same resource facility is shared by more than one Activity Block or when a preceding Reservation Request message has been transmitted by an Activity Block that does not itself pause to wait for the corresponding Reservation Acknowledgement message (In message). Otherwise, an incoming message from a Resource Handler could be directed to an Activity Block Container or Activity Block more precisely, to which the message was not intended to go. The Application Session Manager ASM also supervises the releasing of resource reservations by giving the required advisory information to the Activity Blocks, for example, in overload and error conditions.

The Resource Handlers keep a list of all the Resource Reservation Instances RI in corresponding Resource Instance Records RIR that are stored in the Resource Instance Table RIT of each Resource Handler. When an Activity Block in some Activity Block Container requests for the creation of a Resource Reservation Instance for itself, information about the type of the required Resource Reservation Instance is preferably sent by the Activity Block directly to the related Resource Handler RH or to the Resource Allocation Manager RAM. For example, in the case of resources installed for data transmission, it may be possible to select the data transmission rate, the required transmission error rate, etc., wherein parameters affecting these characteristics of the Resource Reservation Instance can be provided in the Resource Reservation Instance RI request (Reservation Request message, Con message). Thus, after receiving the Reservation Request message, the Resource Handler RH or the Resource Allocation Manager RAM preferably examines, if a Resource Reservation Instance RI with the requested parameter values can be created as a response to the request from the Activity Block. A previously created Resource Reservation Instance may also be existing and free for re-use, if it meets the parameter requirements of the request. An Activity Block or Activity Block Container can use an Outward Control message (Out message) to vacate its Resource Reservation Instance, wherein the related Resource Handler RH labels the Resource Reservation Instance to be vacant in the sense that another Activity Block or application session can request the reservation of the same Resource Reservation Instance. If the creation or release of a Resource Reservation Instance requires that some actions are performed by the resource facility itself, the related Resource Handler RH is aware of incomplete status of the creation or release operation, and the corresponding requesting Activity Block or application session may need to wait e.g. for the acknowledgement of a Resource Reservation Instance. The Resource Allocation Manager is provided with information about the resource allocation situation of all the resource types. The aim of this arrangement is to prevent the occurrence of overload conditions of some resource type.

The Application Session Manager ASM and the Resource Allocation Manager are preferably designed to be without intermediate delayed states, wherein the changes of session-related status information are stored in said Session History Table SHT, and the changes of session-related information of Resource Reservation Instances are stored in said Resource Allocation Table RAT. Also, the Resource Handlers are preferably designed to be without intermediate delayed—states, wherein changes of the status data of individual Resource Reservation Instances are stored in the Resource Instance Table RIT of each Resource Handler.

More than one Resource Reservation Instance of the same resource can be existing simultaneously, for example, in a situation in which several Activity Blocks in one or more sessions need to use the same resource type substantially simultaneously. These Activity Blocks using the same resource are normally not located in the same Activity Block Container, but they can rather be in different containers in the context of different sessions. In this case, it is important to ensure that the application-originated Reservation Request messages (Con messages) to the Resource Handlers and the corresponding Reservation Acknowledgement messages (In messages) from the Resource Handlers can be coupled with each other. For this purpose, the Resource Allocation Manager RAM is designed to perform functions, that enable the Resource Allocation Manager RAM to handle simultaneously pending requests related to any single Resource Handler, for example, maintenance of a Waiting List and forwarding of each request in this order to the relevant Resource Handler at the right time. The transmission of Reservation Acknowledgement messages from a Resource Handler to the correct Activity Block Container per each Reservation Request message, is based on the assumption that the particular Activity Block Container that generated the request always stays actively waiting for the corresponding Reservation Acknowledgement message, and each Reservation Request message contains an unique Reference identifier. In the association with the generation of each Reservation Request message, the Activity Block provides the request with a Reference identifier, providing the Application Session Manager ASM information about the request and its Reference identifier for the recording of a Correlation Reference Record CRR in a Correlation Reference Table CRT. The use of Reference identifiers enables that multiple Reservation Request messages are simultaneously pending and Reservation Acknowledgement messages can also be waited for in an asynchronous mode.

The same Correlation Reference Table CRT is also used to store the Reference identifiers of those application messages, for which a responding application message is waited for by the application session via a Resource Handler (e.g. a data transmission connection). The use of Reference identifiers enables that multiple request messages can be simultaneously pending and the waiting mode can be asynchronous.

An Activity Block itself also releases a Resource Reservation Instance, unless the Application Session Manager has wanted the Resource Reservation Instance to be kept for the succeeding or later Activity Blocks of the same session. In possible error situations, the Application Session Manager ASM activates the execution of the required application-independent release function(s). Thus, the Resource Reservation Instance will not be kept unnecessarily reserved.

The actual processing of Reservation Request messages is performed by the Resource Handlers, one of them preferably established per each resource type. Each Resource Handler RH(i) is a software process (OS task of handler type) that is intended to use the Resource Reservation and Outward Control messages (i.e. Reservation Request and Outward control messages) of the corresponding resource type, in the same manner in the case of all the different sessions and resource types. In the design of the Resource Handler RH(i) of each resource type i, the specific features of the related resource type, e.g. the processing of video signals, audio signals, text messages, etc., are taken into account. The Resource Handler maintains a list of Resource Reservation Instances created for the use of the related resource. The operation of the Resource Handlers is scheduled according to the needs determined by the application sessions, making use of the task switching functionality of the Operating System.

The Activity Block Container ABC is a software process (OS task) composed of the Activity Blocks of one or more different Application Session Profiles and by the frame structure of the Activity Block Container. Each container normally contains several Activity Blocks, and the execution of these blocks is sequential within the same container but parallel in the case of different containers. In each Activity Block Container, one block is the so-called Waiting Block IB to enable waiting for asynchronous events. In addition, each container comprises an Incoming State Module ISM, a Branching State Module BSM, and an Outgoing State Module TSM for terminating the execution thread of the Activity Block Container (i.e., for moving it away from the active running state of an OS task). In addition, each Activity Block includes a Start State Module SSM in its beginning and an End State Module ESM in its end. The Activity Block Container ABC also comprises e.g. a list of variables, data structures, and memory allocations, as well as information about the Resource Reservation Instances, etc., that is needed for the operation of the Activity Block Container. The Activity Block Container ABC receives messages from the Application Session Manager ASM to trigger the execution of Activity Blocks. In addition, the above-mentioned state modules and the Waiting Block of the Activity Block Container generate Outward Control messages (Out messages) of the Session Control Protocol to the Resource Allocation Manager RAM that forwards them further on to the Application Session Manager ASM. These Outward Control messages are used, for example, in situations in which the execution of an Activity Block has been interrupted to wait until a specific condition is satisfied, e.g. the arrival of an application message to the Wireless Communication Device, or the processing of the block is completed.

The Session Control Protocol SCP specified for the system of the current invention is used, for example, to enable co-operation of the Functional Blocks of the system via the delivery of Session Control Protocol messages between these Functional Blocks. This is a kind of messaging functionality between the Functional Blocks that participate in the execution of the application session. The Session Control Protocol SCP can be utilized to control the load level of the processor of the Wireless Communication Device to avoid and manage overload conditions. In addition, the Session Control Protocol can be used to control the scheduling of the initiation of individual activities during an application session, and to deliver process identifiers PID of the software processes (OS tasks) in the Functional Blocks of the session, as well as other application-independent information from one Functional Block to another. The Session Control Protocol can be used to prioritize the application sessions, for example, by means of the scheduling of individual activities included in the profiles of parallel sessions. The Session Control Protocol enables the Application Session Manager to perform optimal synchronization of the reservations of shared resources in the system of the invention, including resources related to telecommunication connections.

The aim has been to specify the Session Control Protocol in a way that the actions related to resource reservation, e.g. Reservation Request messages (Con messages), can be performed in different application sessions in a uniform manner as far as possible, irrespectively of the resource type. This facilitates, for example, to design of the code of the Activity Blocks.

In the course of the Session Control Protocol, various messages are used to control the system and to transfer information between different Functional Blocks. In this context, these messages are referred to as Session Control Protocol messages, including e.g. the Inward Control message Do, the Outward Control message Out, the Reservation Request message Con, and the Reservation Acknowledgement message In. In addition, separate messages are needed for exception conditions, which need not however be discussed in more detail in this context. The data definition may vary in different messages, but each message preferably contains information about the related application session as well as the process identifier PID of the sender and receiver. Normally these messages also contain one or more data fields, in which data complying with the message type is transmitted to the receiver of the message. Messages of the Session Control Protocol are used to convey, for example, process identifiers of dynamically created or selected Resource Handlers or Activity Block Containers (software processes) participating in the same session.

As already stated above, the execution of an Activity Block is initiated by an Inward Control message (Do message) from the Application Session Manager ASM. The Inward Control message can be used to inform the Activity Block of the resources that are available to the block for reservation. The Inward Control message can also be used to inform the Activity Block about the Resource Reservation Instances that should be reserved or released by the Activity Block. As an example, one can mention the situation of setting up a call, while the required communication resources are vacant. Thus, the Activity Block to be used for setting up the call can be advised to reserve the data transmission resources required for the call. After the execution of the Activity Block has been completed, it generates an Outward Control message (Out message) to the Resource Allocation Manager RAM. In relevant cases, this Outward Control message contains e.g. information about the resources reserved or released by the Activity Block. In addition, this Outward Control message (Out message) is sent to those Resource Handlers whose Resource Reservation Instances are released by the Activity Block either to other Activity Blocks of the same session or to other application sessions. A subsequent Activity Block of the same session can reserve a vacant Resource Reservation Instance for its use by sending an Outward Control message (Out message) to the related Resource Handler, thus providing the Resource Handler the process identifier of the container of this Activity Block as an indication of this new reservation. Each Resource Handler only holds the identifier of one Activity Block Container at a time, or in the absence of a visible container a default value, e.g. the process identifier of the Application Session Manager or some other default container associated with the resource type. The above-mentioned arrangement allows each individual Resource Reservation Instance to have separate visibility towards the Activity Block Containers. Since the high process priority of the Application Session Manager ASM helps it to get the processor essentially without delay after each execution turn of the Resource Allocation Manager RAM, the resource allocation situation is at least partially unambiguously known at this moment from the viewpoint of the Application Session Manager ASM. Thus, the Application Session Manager ASM is able to find out which Activity Blocks can be activated and which resources can be assigned to them.

As a summary of the resource reservation control mechanism, it should be stated in this context that during its execution an Activity Block can have direct access to request and use a required resource, if this resource happens to be vacant. For this purpose, the Activity Block sends a Reservation Request message directly to the Resource Handler of the requested resource type, which examines if the requested resource can be allocated to the requesting Activity Block. As a response, the Resource Handler returns a Reservation Acknowledgement message containing either a positive acknowledgement (ACK flag) or a negative acknowledgement (NACK flag), depending on whether the requested resource can or can not be allocated to the requesting Activity Block at that time. Presuming that the control information for resource allocation provided in the Inward Control message from the Application Session manager ASM to the Activity Block is well targeted the Reservation Acknowledgement messages from the Resource Handlers are normally nonnegative. If the need for a resource is not necessarily immediate, or the abovementioned Inward Control message indicates the resource to be reserved, e.g. for another use, the Activity Block can send the Reservation Request message to the Resource Allocation Manager RAM that manages a Waiting List. At this point, the Activity Block Container that contains the Activity Block transmitting the Reservation Request message to the Resource Allocation Manager RAM remains waiting for the Reservation Acknowledgement message in either synchronous or asynchronous manner. Later on, depending on the resource allocation situation, the Resource Allocation Manager RAM forwards the waiting Reservation Request message to the related Resource Handler which then returns a positive Reservation Acknowledgement message directly to the Activity Block Container of the requesting Activity Block. To achieve this objective, the Application Session Manager ASM may have to give Inward Control messages (Do messages) e.g. to Activity Block Containers of some parallel application sessions in order to release selected Resource Reservation Instances.

The functionality of the current invention can be largely implemented in the form of program code for the Processor 2 of the Wireless Communication Device 1. The Resource Allocation Manager and the Resource Handlers can be seen as a kind of Middleware layer between the Operating System and applications of the Wireless Communication Device 1. From the viewpoint of the Operating System, the functions in the system of the invention are realized by the processing of one or more schedulable execution threads. The invention is not bound to any specific Operating System, but the invention can be applied in the connection of Operating Systems that have a multi-task capability. However, the Operating System preferably meets the requirement that during multi-task processing the suspension of one schedulable process (execution thread) and the continuation of another process can only take place at pre-determined points of the program code instead of any arbitrary point. The designer of the program code defines and sets those points in which the Operating System can switch the process executed (OS task). These kind of suspension capabilities are preferably located at those points where the processing of the code of an Activity Block Container or the entire application session can be interrupted for a natural reason, for example when waiting for a response from a Resource Handler.

Figure 4:
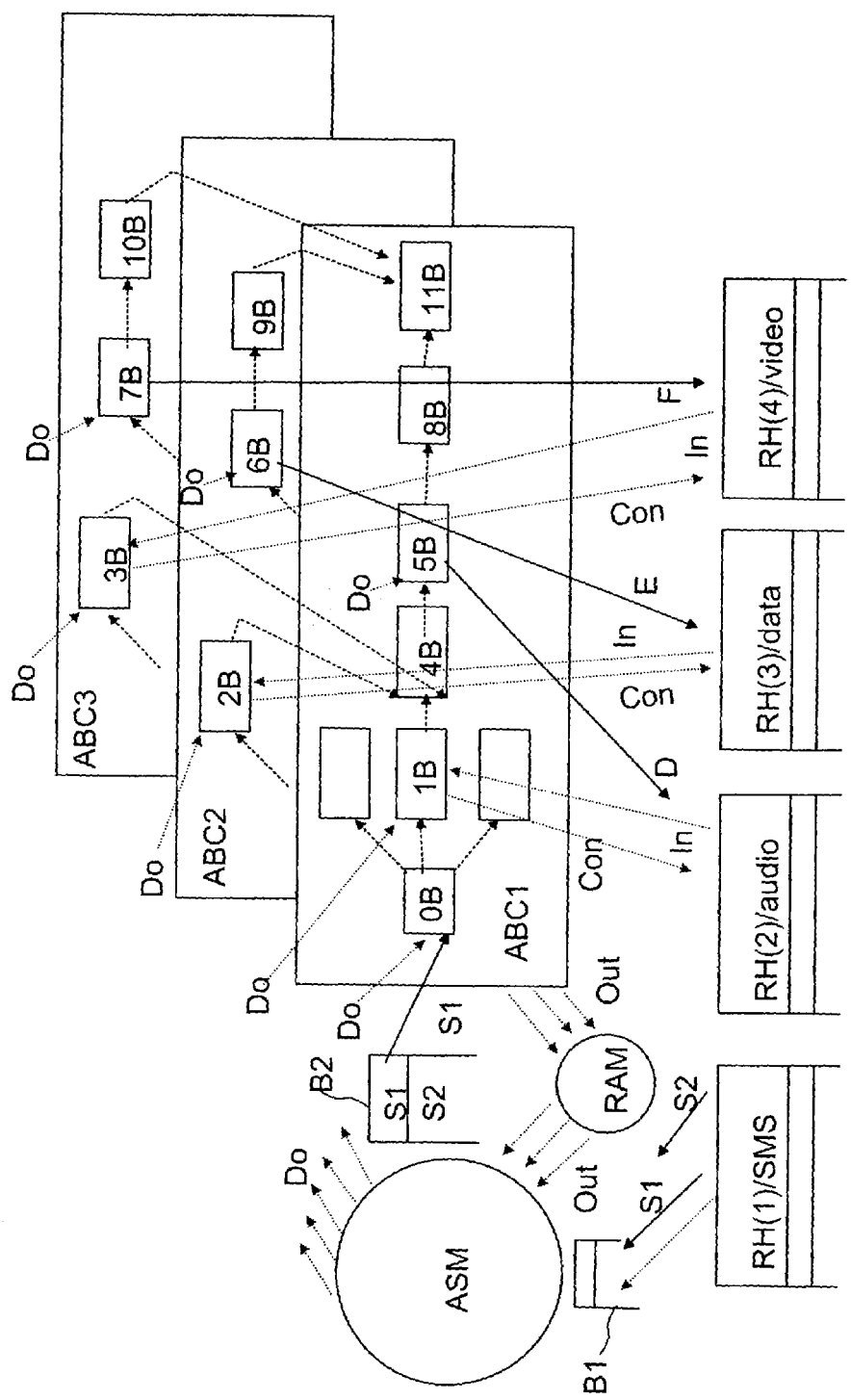
FIG. 4 shows the utilization of the method of the invention in the case of an application session example.

In the following, the operation of a method corresponding to a preferred embodiment of the invention will be described with reference to the example situation shown in FIG. 4. In the figure, the arrows indicated with solid lines illustrate the transmission of messages between different blocks, the arrows with broken lines illustrate the procedure of executing an application session one activity after another, and the arrows with dotted lines illustrate the transmission of Session Control Protocol messages of the application session between the blocks.

Let us assume that the Wireless Communication Device 1 has been turned on and the Operating System is started. At some stage, the Operating System preferably starts the operation of the system corresponding to the invention by activating the operations to initialise the Application Session manager ASM, the Resource Allocation Manager RAM, and the Session Control Protocol SCP. At the time when an application session is to be started, an application session request is conveyed to the Application Session Manager ASM. The initiation of the application session may be caused by a request from another application session, an external event such as an incoming call to the wireless terminal 1, a key pressed by the user of the wireless terminal 1, etc. In the situation of FIG. 4, a text message has arrived to the wireless terminal 1 causing the initiation of a new application session. The Resource Handler RH(1) of the connection type of the received text message has transmitted a Session Request message S1 that has been placed in the Message Buffer B1. The Application Session Manager ASM detects the arrival of the message in the Message Buffer B1, reads the particular data field of the message needed for the identification of the requested application session, and then reads the session profile of the application session to be started in the Application Profile Table APT. At this point, the history profile data of the current application session is initialised in the Session History Table SHT. The Application Session Profile ASP discloses, e.g., the activities included in the session and possibly the Resource Reservation Instances needed correspondingly as well as the estimated processing times specified per each Activity Block. On the basis of the profiles of the ongoing sessions processed or suspended, the data contents of the Resource Allocation Table RAT, and the profile of the session to be started, the Application Session Manager ASM performs an analysis to find out whether the session can be started or not. The Application Session Manager ASM calculates an estimate of the increased load of the Processor 2 caused by starting the session. In addition, the Application Session Manager ASM analyses the resource allocation situation of those resources needed by the session to be started, estimating the load level of these resources too. If the Application Session Manager ASM makes a decision to start the session, the Application Session Manager ASM selects some Activity Block Container ABC in which the Activity Block of the first activity of the session profile of the current session is included. The selected Activity Block Container ABC is loaded into the memory Device 4 for the execution of the abovementioned first Activity Block, unless it is already in the memory and available for execution. In the example of FIG. 4, the application session to be started contains a set of activities, which correspond to Activity Blocks 0B-11B. The execution of the session is started by activating the first Activity Block 0B at the time when the Activity Block Container ABC of this Activity Block gets the processor after the abovementioned downloading. As already stated above in this description, the relative urgency of the application sessions with respect to each other can be determined in order to use it as a basis for controlling the allocation of processor time to each session as well as to control the execution order of the sessions.

From the Message Buffer B1, the Application Session Manager ASM moves the received Session Request message S1 from the Message Buffer B1 to another Message Buffer B2 essentially at the same moment when it gets processor time from the Operating System. At the time when the execution of a new application session can be started, the Application Session Manager ASM transmits an Inward Control message (Do message) to the selected Activity Block Container ABC that contains the first Activity Block 0B of the session. As a result, the execution of the Activity Block 0B is initiated. In this example, after the execution of the Activity Block 0B has been completed and the corresponding Outward Control message (Out message) has been returned to the Resource Allocation Manager RAM, the Application Session Manager ASM (after having received this Outward Control message from the Resource Allocation Manager RAM) transmits, on the basis of the Application Session Profile, an Inward Control message (Do message) to three Activity Block Containers ABC1, ABC2, ABC3 for the execution of three Activity Blocks 1B, 2B, 3B respectively, with the intention to establish connections of these different types in parallel. In this example, these connection types are audio, data and video, respectively. Each Activity Block 1B, 2B, 3B transmits a Reservation Request message (Con message) to the Resource Handler RH(2), RH(3), RH(4) of its connection type respectively. Each Reservation Request message contains relevant information, such as the process identifier or some other identifier of the Activity Block Container that generates the message. By means of this information, the Resource Handler can return a Reservation Acknowledgement message (In message) to the correct Activity Block Container. The Resource Handler returns a Reservation Acknowledgement message (In message) after it has transmitted the Reservation Request message (Con message) from the Activity Block Container to the connection protocol program and also received an acknowledgement of the establishment of this connection from the protocol program. Thus, the Activity Block in the Activity Block Container receives either a negative Reservation Acknowledgement message or a positive one as an indication that the Resource Handler has, within the capacity limits, allocated a Resource Reservation Instance to the application session and that the Resource Handler has performed any initializing and recording actions possibly required for using the resource. In addition, it is an aim of the Resource Handler to transmit application messages received from the related connection protocol program always to the Activity Block Container that participates in the execution of the application session and has provided its identifier to the Resource Handler. The application session will preferably pause to a waiting state at the time when it stops to wait for the related Reservation Acknowledgement message (In message) from the Resource Handler after the transmission of a Reservation Request message (Con message). Information about the beginning of this waiting state is preferably delivered to the Resource Allocation Manager RAM by means of an Outward Control message (Out message) at the same time with the transmission of each Reservation Request message. In the Activity Block 4B of FIG. 4, it is waited that a Reservation Acknowledgement message is obtained as a response to all the three Reservation Request messages before it is time to proceed to the generation of data to be transmitted from the wireless terminal 1 along the different connection types. In the case of a general application session, the Activity Blocks 5B, 6B and 7B can use different connection types on behalf of this session to interactively exchange application messages with the applications at the other ends of the connections, wherein it is beneficial that the Activity Blocks 5B, 6B and 7B are located in three separate Activity Block Containers. In the general case, an application session may contain a much larger number of Activity Blocks that are executed in parallel.

The scheduling of the operation of the Resource Handlers is arranged by means of the functionality and scheduling mechanism of the Operating System so that the actions of the Resource Handlers are executed right after the Activity Blocks have sent messages to them for processing. The Resource Handlers are furnished with an interface, through which the Activity Block Containers are able to send Session Control Protocol messages and outgoing application messages to the Resource Handlers and, vice versa, to receive messages correspondingly from the Resource Handlers. This interface is independent of the applications and substantially also independent of the resource type, which enables the use of substantially standard messages in the Session Control Protocol. In addition, the Resource Handler transmits application messages both from the Activity Block Containers to the resource facility and vice versa from this facility to the Activity Block Containers and/or the Application Session Manager ASM. Per each Reservation Request message, the Resource Handlers create a reservation (Resource Reservation Instance RI) which is a kind of a definition of the Resource Reservation Instance including parameters related to the use of this reservation, such as the data transmission rate, resolution of the display, stereo versus mono voice output, etc. Resource Reservation Instances are registered as Resource Instance Records RIR in a Resource Instance Table RIT. Each Resource Handler is associated with a Resource Instance Table of its own. Each Resource Handler takes care of its own Resource Reservation Instances and provides information about them to the Resource Allocation Manager RAM. Consequently, the Resource Allocation Manager RAM preferably holds the bookkeeping data of all the existing Resource Reservation Instances in the Resource Allocation Table RAT.

The Resource Allocation Manager RAM offers the data contents of the Resource Allocation Table to the Application Session Manager ASM, that uses this information e.g. to bring the processing of different application sessions from a suspension state to an active processing state. The Resource Allocation Manager RAM also receives the Outward Control messages generated by the Activity Block Containers, such as information of the completion of the execution of an Activity Block, or the beginning of a synchronous waiting state within an Activity Block, or the arrival of a Reservation Acknowledgement message from a Resource Handler to an Activity Block Container.

After the Resource Allocation Manager RAM has provided the data contents of the Resource Allocation Table to the Application Session Manager ASM, the Processor 2 starts executing the code of the Application Session Manager ASM that selects the next application session and more precisely the next Activity Block to be executed. As a selection criterion, the Application Session Manager ASM uses e.g. the resource allocation situation and the load level of the Processor 2. An Inward Control message (Do message) is preferably transmitted to the selected Activity Block Container that contains this kind of Activity Block in order to initiate the execution of the Activity Block. More than one Activity Block can be processed substantially at the same time assuming that they are included in separate Activity Block Containers (so-called parallel software processes). In practice, this means that the Processor 2 executes the code of these Activity Block Containers in an alternating manner. As an example of this kind of parallelism, there are firstly Activity Blocks 1B, 2B, 3B, and secondly 5B, 6B, 7B and thirdly 8B, 9B, 10B in the example of FIG. 4. However, in multiprocessor systems, true parallel processing is also possible for the execution of the code in the Activity Block Containers.

Let us assume that processor time is given to the Activity Blocks 5B, 6B, 7B that make up the data contents of audio, data and video types to be sent out from the wireless terminal 1, as well as the application messages required for the control of this data transmission. In other words, these Activity Blocks 5B, 6B, 7B generate the data contents for the transmission and transmit the necessary application messages to the corresponding Resource Handlers RH(2), RH(3), RH(4). These messages are indicated with the reference labels D, E, F in FIG. 4. The Resource Handlers perform the functions required to transmit the data contents of these three different types from the wireless terminal 1. After these three data transmission activities are accomplished, Outward Control messages (Out messages) are generated by the Activity Blocks 8B, 9B, 10B to release the three Resource Reservation Instances respectively. After this, the execution of the application session can be completed by executing the terminating block 11B. The memory spaces allocated for the useless Activity Block Containers ABC1, ABC2, ABC3 can be released and the parameter data of the Resource Reservation instances used by the terminated session can be deleted in the Resource Instance Tables RIT and the Resource Allocation Table RAT.

The processing of the next Session Request message S2 is performed in accordance with the principles presented above.

Figure 3:
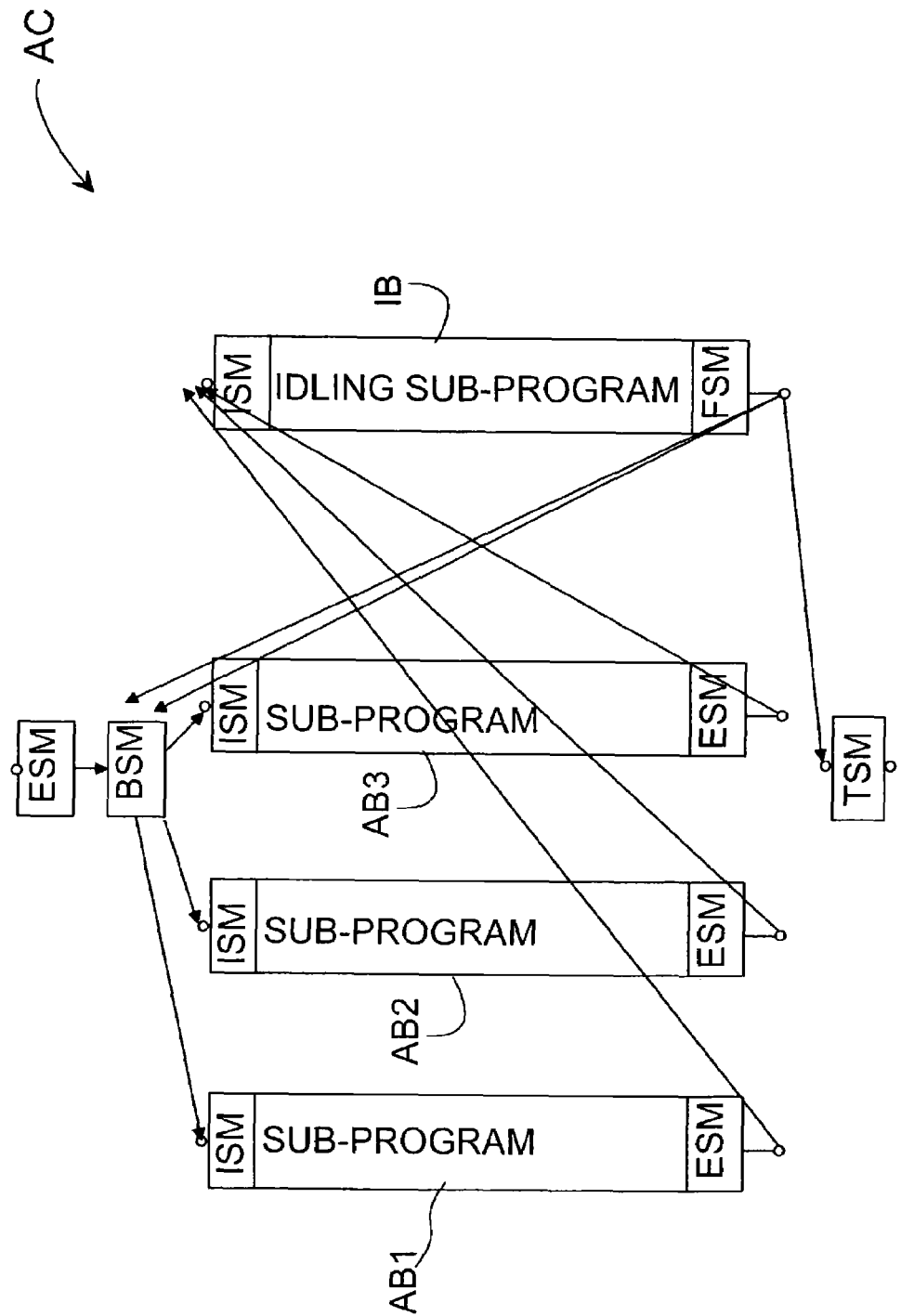

FIG. 3 also shows the structure of an Activity Block Container ABC and the progression of the execution of the Activity Blocks in the Activity Block Container ABC. The Activity Block Container contains an Incoming State Module ISM that is always executed at the time when a vacant Activity Block Container receives the first activating Inward Control message. After that, the Activity Block Container contains a Branching State Module BSM that reads the identifier of the next Activity Block to be executed in order to find out to which Activity Block AB1, AB2, AB3 the execution thread of the Activity Block Container should be taken. The end point of each Activity Block is equipped with an End State Module ESM that signals the completion of the block to the Resource Allocation Manager RAM by means of an Outward Control message (Out message) and thereby further to the Application Session Manager ASM, after which the execution thread of the Activity Block Container ABC is taken to wait for the next Inward Control message (Do message) in order to be able to continue the execution of the session from the next Activity Block onwards as soon as this block container gets processor time from the Operating System. For this purpose, the execution thread is taken from the End State Module ESM to the beginning of the Waiting Block IB where a Waiting State Module ISM located for the reception of any messages from the Resource Handlers to the Activity Block Container. This kind of message is received by the Waiting Block and preserved in a specific Temporary Message Buffer, after which the Transition State Module FSM at the end of the Waiting Block generates an Outward Control message (Out message) to the Resource Allocation Manager RAM and further on to the Application Session Manager ASM, informing them about the received message. The processing of the Waiting Block IB ends when the execution thread of the Activity Block Container is taken to the beginning of any embedded Activity Block on the basis of the next Inward Control message (Do message) received by the Waiting State Module ISM. In this case, the execution thread is deviated from the Transition State Module FSM in the end of the Waiting Block IB via the Branching State Module BSM to the beginning of the Activity Block to be processed next. The Application Session Manager ASM can use a particular parameter of the Inward Control message to instruct the execution control to be directed from the Waiting Block after the Transition State Module FSM to the Outgoing State Module TSM of the Activity Block Container, in order to terminate the execution control of the block container and to release the container. After the Outgoing State Module TSM, the Activity Block Container is free, in view of the Application Session Manager ASM, to be selected for the execution of any Activity Block therein, in the context of any application session. When the message received by the Waiting Block IB does not deviate the execution thread to the Branching State Module BSM or the Outgoing State Module TSM, the execution control will always return from the Transition State Module FSM of the Waiting Block IB to the Waiting State Module ISM in the beginning of the Waiting Block IB to continue the idle waiting.

In those situations where the load of the Processor 2 is relatively low, the Application Session Manager ASM can adjust the power consumption of the Processor 2 to be lower, e.g. by reducing the clock frequency. On the other hand, in the case of some processors the power consumption can be regulated by setting at least some of those Functional Blocks of the processor, that are not needed at the moment, into a power saving mode.

To a great extent, the current invention can be implemented in the form of software, for example as executable instructions of the Processor 2. It is should be understood that the current invention is not limited solely to the above-presented embodiments only, but it can be modified within the scope of the appended claims.

The invention claimed is:

1. A system comprising one or more processors configured to execute application sessions in an electronic device, and to schedule resource reservation instances as well as to execute substantially simultaneous application sessions, wherein an application session to be executed comprises one or more activity blocks in one or more activity block containers, and an execution order is specified for said activity blocks; the one or more processors configured as resource type specific resource handlers to reserve resources for the application session, as resource allocation manager to analyze and save a resource allocation situation, as an application session management and scheduling manager to select at least a next application session and activity block to be executed on the basis of said resource allocation situation, said one or more processors configured to execute the next activity block in the course of the selected application session, and the one or more processors are configured to use protocol connecting the resource handlers, resource allocation manager, application session management and scheduling manager, to control the execution order and to implement the transfer of information between said resource handlers, resource allocation manager, application session management and scheduling manager, the system further comprising an operating system with scheduling functions, and for synchronizing the reservation, release and other resource-related control from the application session management and scheduling manager, activity block containers, resource allocation manager, and resource handlers, there is a session control protocol comprised of application-independent control messages and rules on use thereof, which is arranged during operation to implement the synchronization and scheduling control of the execution of the application session management and scheduling manager, the activity block containers, the resource allocation manager, as well as the resource handlers, based on task switching functions of the operating system as well as task priorities of the operating system defined for the application session management and scheduling manager, the activity block containers, the resource allocation manager, and the resource handlers, said one or more processors configured for bookkeeping of the resource allocation situation, configured to transmit a first control message to an activity block to provide control information on the resource allocation to the activity block at the time of initiation of the activity block, and for transmitting a second control message at the time of the completion of the execution of the activity block to provide information about the resources reserved or released by the activity block to update the bookkeeping of the resource allocation situation after the completion of each activity block, said system configured for an application session to reserve resources needed by each activity block, as well as to release them, either directly from resource type specific resource handlers or from the resource allocation manager that enable queuing of reservation request messages, on the basis of control parameters received in the first control message, said one or more processors configured to make the resource reservation instances created on a request from the application session, via the use of said second control message, dynamically available to different activity block containers involved in execution of the session, as needed, wherein an end state module is placed at the end of each activity block to complete the execution of the block, and a waiting state module is placed in the activity block container holding the activity block, and wherein execution control of the activity block container holding the activity block is arranged to generate said second control message in the end state module and to pause the execution in the waiting state module in order to wait for a first control message from the application session management and scheduling manager, wherein the execution of the application session is temporarily interrupted regarding the current activity block container.

2. The system in accordance with the claim 1, comprising a resource instance table per each resource handler to provide the resource allocation situation to said resource allocation manager, and the synchronization of the resource allocation manager with respect to the resource handlers is arranged to be determined so that substantially immediately after each execution turn of the resource handlers it is the turn of the resource allocation manager, wherein the resource allocation situation is unambiguously known in the resource instance tables regarding most lately occurring changes.

3. The system in accordance with claim 2, wherein the synchronization of the resource allocation manager with respect to the application session management and scheduling manager is determined so that substantially immediately after each execution turn of the resource allocation manager it is the turn of the application session management and scheduling manager, wherein the resource allocation situation is unambiguously known regarding the latest changes to have occurred, and values can be determined by the application session management and scheduling manager for the parameters of the control messages generated by it for the synchronization of the use of various types of resource reservation instances.

4. The system in accordance with claim 1, wherein the application session management and scheduling manager are arranged to analyse the resource allocation situation and the scheduling of the sessions to be executed to detect an overload condition of one or more resources and to manage it by replacing, as needed, application sessions with other application sessions requiring less resources, or by delaying, as needed, the transmission of first control messages to the application sessions, which results in a temporary suspension of the ongoing application session or in a delayed initiation of a new application session.

5. The system in accordance with the claim 1, wherein the activity blocks of the application session are placed in one or more activity block containers, that activity blocks in any one of these activity block containers are arranged to be executed temporally at different times, and in the presence of activity blocks that are intended to be executed substantially at the same time in the course of the session, they are placed in different activity block containers.

6. The system in accordance with claim 5, wherein for designing applications that are to be executed in the system, each activity block container is furnished with an interface module at those points where the execution of an activity block or the activity block container can be interrupted and it may be the turn of another operating system task to be executed, thus enabling the sending and reception of session control protocol messages to take place via this interface of the activity block container without a need to deal with these messages of the protocol as part of the application design work.

7. The system in accordance with claim 1, wherein the resource handlers are equipped with an interface for transmitting information between each resource handler and the system, this interface being substantially independent of the application session and the resource type.

8. The system in accordance with the claim 1, comprising a dedicated resource instance table in the use of each resource handler, and the resource handlers are designed to be without intermediate delayed states, wherein the changes of the status data of individual resource reservation instances are stored in the resource instance table of each resource handler.

9. The system in accordance with the claim 1, wherein the application session management and scheduling manager is associated with a session history table and the resource allocation manager is associated with a resource allocation table, and the application session management and scheduling manager and the resource allocation manager are designed to be without intermediate states, wherein changes of session-related status information is stored in said session history table, and changes of session-related information of resource reservation instances are stored in said resource allocation table.

10. The system in accordance with the claim 1, configured to determine a load condition of at least one processor of said one or more processors and to adjust the power consumption of the at least one processor on the basis of the load condition through scheduling of activities of the application sessions.

11. A method for executing application sessions in an electronic device with one or more processors for synchronizing resource reservation instances as well as the execution of substantially simultaneous application sessions, wherein the application session to be executed comprises one or more activity blocks in one or more activity block containers, and an execution order is determined for said activity blocks, the method comprising at least the following:

resource management and allocation for requesting and reserving resources for the application session, bookkeeping and analysis for saving and analysing the resource reservation situation, scheduling and selection for selecting the next application session and activity block to be executed at least on the basis of said resource reservation situation, executing the next activity block in the course of the selected application session, wherein in the method, a communication protocol connecting said resource management and allocation, bookkeeping and analysis, scheduling and selection, and the executing are used to control the execution order and, if necessary, to transfer information between said resource management and allocation, bookkeeping and analysis, scheduling and selection, and executing wherein in the method, an operating system is utilized comprising task switching functions, and that for synchronizing the reservation, release and other resource-related control from the application session management and scheduling manager, activity block containers, resource allocation manager and the resource handlers, there is a session control protocol comprised of application-independent control messages and rules on use thereof, which is arranged, during operation, to implement synchronization and scheduling control of the execution of the application session management and scheduling manager, the activity block containers, the resource allocation manager, as well as the resource handlers, on the basis of the task switching functions of the operating system as well as the task priorities of the operating system defined for the application session management and scheduling manager, the activity block containers, the resource allocation manager, and the resource handlers, wherein a bookkeeping of the resource allocation is maintained, and a first control message is transmitted to an activity block to provide control information on the resource allocation at the time of the initiation of the activity block, and a second control message is returned by the activity block to provide information about the resources reserved or released by the activity block to update bookkeeping of the resource allocation situation after the completion of each activity block, wherein the resources needed by each activity block are reserved and released by the application session, either directly from resource type specific resource handlers or from the resource allocation manager that enable the queuing of reservation request messages, on the basis of control parameters received in a first control message received from application session management and scheduling manager, wherein second control messages are used by the application session to dynamically assign resource reservation instances to the use of different activity block containers involved in the execution of the session, as needed, wherein an end state module is placed at the end of each activity block to complete the execution of the block, and a waiting state module is placed in the activity block container holding the activity block, and the execution control of the activity block container holding the activity block generates a second control message in the end state module and pauses the execution in the waiting state module in order to wait for an first control message from the application session management and scheduling manager, wherein the execution of the application session is temporarily interrupted regarding the current activity block container.

12. The method in accordance with the claim 11, wherein in the method, a resource instance table is used per each resource handler to provide the resource allocation situation to said resource allocation manager, and the synchronization of the bookkeeping and analysis with respect to the resource management and allocation of the resource handlers is determined so that substantially immediately after each execution turn of the resource handlers, it is the turn of the bookkeeping and analysis, wherein the resource allocation situation is unambiguously known in the resource instance tables regarding changes that have occurred.

13. The method in accordance with claim 11, wherein scheduling of the scheduling and selection with respect to the bookkeeping and analysis is determined so that the scheduling and selection is in turn substantially immediately after the execution of the bookkeeping and analysis, wherein the resource allocation situation is unambiguously known in the resource allocation table regarding the latest changes occurred, and values can be determined by the application session management and scheduling manager for the parameters of the control messages generated by it for the synchronization of the use of various types of resource reservation instances.

14. The method in accordance with claim 11, wherein the application session management and scheduling manager analyzes the resource allocation situation and the scheduling of the sessions to be executed to detect an overload condition of one or more resources and to manage it by replacing, as needed, application sessions with other application sessions requiring less resources, or by delaying, as needed, the transmission of first control messages to the application sessions, which results in a temporary suspension of the ongoing application session, or in a delayed initiation of a new application session.

15. The method in accordance with the claim 11, wherein the activity blocks of the application session are placed in one or more activity block containers, activity blocks in any one of these activity block containers are executed temporally at different times, and in the presence of activity blocks that are intended to be executed substantially at the same time in the course of the session, they are placed in different activity block containers.

16. The method in accordance with claim 15, wherein for designing applications that are to be executed in the system, each activity block container is furnished with an interface module at those points where the execution of an activity block or activity block container can be interrupted and it may be the turn of another operating system task to be executed, thus enabling the sending and reception of session control protocol messages to take place via this interface of the activity block container without a need to deal with these messages of the session control protocol as part of application design work.

17. The method in accordance with claim 11, wherein the resource handlers are equipped with an interface for transmitting information between each resource handler of the system, this interface being substantially independent of the application session and the resource type.

18. The method in accordance with claim 11, wherein a dedicated resource instance table is in the use of each resource handler, and the resource handlers are designed to be without intermediate delayed states, wherein the changes of the status data of individual resource reservation instances are stored in the resource instance table of each resource handler.

19. The method in accordance with claim 11, wherein a session history table is in the use of the scheduling and selection, and a resource allocation table is in the use of the bookkeeping and analysis, the resource management and allocation, bookkeeping and analysis, as well as scheduling and selection are designed to be without intermediate delayed states, wherein the changes of session-related status information is stored in said session history table, and the changes of session-related information of the resource reservation instances are stored in said resource allocation table.

20. The method in accordance with claim 11, wherein a load condition of the processor is determined, and power consumption of the processor is adjusted based on the load condition through scheduling of the activities of the application sessions.

21. An electronic device comprising one or more processors configured to execute application sessions, and configured to schedule resource reservation instances as well as the execution of substantially simultaneous application sessions, wherein the application session to be executed comprises one or more activity blocks in one or more activity block containers, and an execution order is determined for said activity blocks; the electronic device further comprising resource type specific resource handlers for reserving resources for the application session, resource allocation manager for analyzing and saving a resource allocation situation, application session management and scheduling manager for selecting at least the next application session and activity block to be executed based on said resource allocation situation, and for executing a next activity block in the course of the selected application session; and the electronic device is provided with a protocol connecting the resource handlers, resource allocation manager, application session management and scheduling manager to control the execution order and to implement transfer of information between said resource handlers, resource allocation manager, application session management and scheduling manager, the electronic device further comprising an operating system with scheduling functions, and for synchronizing reservation, release and other resource-related control from the application session management and scheduling manager, activity block containers, resource allocation manager, and resource handlers, wherein there is a session control protocol provided comprising application-independent control messages and rules on use thereof, that is arranged during its operation to implement synchronization and scheduling control of execution of the application session management and scheduling manager, the activity block containers, the resource allocation manager, as well as the resource handlers, on the basis of the task switching functions of the operating system as well as operating system task priorities defined for the application session management and scheduling manager, the activity block containers, the resource allocation manager, and the resource handlers, said device configured for bookkeeping of the resource allocation situation, configured for transmitting a first control message to an activity block to provide control information on the resource allocation to the activity block at the time of the initiation of the activity block, and for transmitting a second control message at the time of the completion of the execution of the activity block to provide information about the resources reserved or released by the activity block to update the bookkeeping of the resource allocation situation after the completion of each activity block, said device configured for an application session to reserve the resources needed by each activity block, as well as to release them, either directly from the resource type specific resource handlers or from the resource allocation manager that enable the queuing of reservation request messages, on the basis of control parameters received in a first control message received from application session management and scheduling manager, said device configured for making the resource reservation instances created on a request from the application session, via the use of second control messages, dynamically available to different activity block containers involved in the execution of the session, as needed, wherein an end state module is placed at the end of each activity block to complete the execution of the block, and a waiting state module is placed in the activity block container holding the activity block, and that the execution control of the activity block container holding the activity block is arranged to generate a second control message in the end state module and to pause the execution in the waiting state module in order to wait for a first control message from the application session management and scheduling manager, wherein the execution of the application session is temporarily interrupted regarding the current activity block container.

22. A wireless communication device comprising one or more processors configured to execute application sessions, and configured to schedule resource reservation instances as well as execution of substantially simultaneous application sessions, wherein an application session to be executed comprises one or more activity blocks in one or more activity block containers, and an execution order is determined for said activity blocks; the wireless communication device further comprising resource type specific resource handlers for reserving resources for the application session, resource allocation manager for analyzing and saving a resource allocation situation, application session management and scheduling manager for selecting at least a next application session and activity block to be executed based on said resource allocation situation, and for executing the next activity block in the course of the selected application session; and the electronic device is provided with a protocol connecting the resource handlers, resource allocation manager, application session management and scheduling manager, to control the execution order and to implement the transfer of information between said resource handlers, resource allocation manager, application session management and scheduling manager, the wireless communication device further comprising an operating system with scheduling functions, and for synchronizing reservation, release and other resource-related control from the application session management and scheduling manager, activity block containers, resource allocation manager, and resource handlers, and comprising a session control protocol comprised of application-independent control messages and rules on their use, which is arranged during operation to implement the synchronization and scheduling control of execution of the application session management and scheduling manager, the activity block containers, the resource allocation manager, as well as the resource handlers, based on the task switching functions of the operating system as well as the operating system task priorities defined for the application session management and scheduling manager, the activity block containers, the resource allocation manager, and the resource handlers, said device configured for bookkeeping of the resource allocation situation, configured for transmitting a first control message to an activity block to provide control information on the resource allocation to the activity block at the time of the initiation of the activity block, and for transmitting a second control message at the time of the completion of the execution of the activity block to provide information about the resources reserved or released by the activity block to update the bookkeeping of the resource allocation situation after the completion of each activity block, said device configured for making the resource reservation instances created on a request from the application session, via the use of second control messages, dynamically available to different activity block containers involved in the execution of the session, as needed, said device configured for an application session to reserve the resources needed by each activity block, as well as to release them, either directly from the resource type specific resource handlers or from the resource allocation manager that enable the queuing of reservation request messages, on the basis of control parameters received in a first control message received from application session management and scheduling manager, wherein an end state module is placed at the end of each activity block to complete the execution of the block, and a waiting state module is placed in the activity block container holding the activity block, and that the execution control of the activity block container holding the activity block is arranged to generate a second control message in the end state module and to pause the execution in the waiting state module in order to wait for a first control message from the application session management and scheduling manager, wherein the execution of the application session is temporarily interrupted regarding the current activity block container.

23. A computer readable medium having a computer program stored thereon comprising machine executable instructions for executing application sessions in an electronic device with one or more processors for synchronizing resource reservation instances as well as the execution of substantially simultaneous application sessions, wherein the application session to be executed comprises one or more activity blocks in one or more activity block containers, and an execution order is determined for said activity blocks, the computer program further comprising machine executable instructions for performing at least the following:

requesting and reserving resources for the application, session, saving and analyzing the resource reservation situation, selecting the next application session and activity block to be executed at least on the basis of said resource reservation situation, executing the next activity block in the course of the selected application session, wherein the computer program also comprises machine executable instructions for using a communication protocol connecting said requesting and reserving resources for the application session, saving and analyzing the resource reservation situation, selecting the next application session and activity block to be executed, and executing the next activity blocks, wherein the computer program is configured to utilize an operating system comprising task switching functions, and that for synchronizing reservation, release and other resource-related control from an application session management and scheduling manager, activity block containers, resource allocation manager and the resource handlers, there is provided a session control protocol comprised of application-independent control messages and rules on use thereof, which is arranged, during operation, to implement synchronization and scheduling control of execution of the application session management and scheduling manager, the activity block containers, the resource allocation manager, as well as the resource handlers, based on the task switching functions of the operating system as well as operating system task priorities defined for the application session management and scheduling manager, the activity block containers, the resource allocation manager, and the resource handlers, wherein a bookkeeping of the resource allocation is maintained, and a first control message is transmitted to an activity block to provide control information on the resource allocation at the time of the initiation of the activity block, and a second control message is returned by the activity block to provide information about the resources reserved or released by the activity block to update the bookkeeping of the resource allocation situation after the completion of each activity block, wherein the resources needed by each activity block are reserved and released by the application session, either directly from resource type specific resource handlers or from the resource allocation manager that enable the queuing of reservation request messages, on the basis of control parameters received in a first control message received from application session management and scheduling manager, said device configured for making the resource reservation instances created on a request from the application session, via the use of second control messages, dynamically available to different activity block containers involved in the execution of the session, as needed, wherein an end state module is placed at the end of each activity block to complete the execution of the block, and a waiting state module is placed in the activity block container holding the activity block, and that the execution control of the activity block container holding the activity block is arranged to generate a second control message in the end state module and to pause the execution in the waiting state module in order to wait for a first control message from the application session management and scheduling manager, wherein the execution of the application session is temporarily interrupted regarding the current activity block container.

24. An electronic device comprising means for executing application sessions, one or more processors, and means for scheduling resource reservation instances as well as the execution of substantially simultaneous application sessions, wherein the application session to be executed comprises one or more activity blocks in one or more activity block containers, and an execution order is determined for said activity blocks; the electronic device further comprising resource type specific resource handlers for reserving resources for the application session, resource allocation manager for analyzing and saving a resource allocation situation, application session management and scheduling means for selecting at least the next application session and activity block to be executed on the basis of said resource allocation situation, executing means for executing the next activity block in the course of the selected application session; and the electronic device is provided with a protocol connecting the resource handlers, resource allocation manager, application session management and scheduling means and executing means, to control the execution order and to implement the transfer of information between said resource handlers, resource allocation manager, application session management and scheduling means, and executing means, the electronic device further comprising an operating system with scheduling functions, and for synchronizing the reservation, release and other resource-related control from the application session management and scheduling means, activity block containers, resource allocation manager, and resource handlers, there is a session control protocol composed of application-independent control messages and rules on use thereof, that is arranged during its operation to implement synchronization and scheduling control of execution of the application session management and scheduling means, the activity block containers, the resource allocation manager, as well as the resource handlers, on the basis of the task switching functions of the operating system as well as the operating system task priorities defined for the application session management and scheduling means, the activity block containers, the resource allocation manager, and the resource handlers, said device configured for bookkeeping of the resource allocation situation, configured for transmitting a first control message to an activity block to provide control information on the resource allocation to the activity block at the time of the initiation of the activity block, and for transmitting a second control message at the time of the completion of the execution of the activity block to provide information about the resources reserved or released by the activity block to update the bookkeeping of the resource allocation situation after the completion of each activity block, said device configured for making the resource reservation instances created on a request from the application session, via the use of second control messages, dynamically available to different activity block containers involved in the execution of the session, as needed, said system configured for an application session to reserve the resources needed by each activity block, as well as to release them, either directly from the resource type specific resource handlers or from the resource allocation manager that enable the queuing of reservation request messages, on the basis of control parameters received in a first control message received from application session management and scheduling manager, wherein an end state module is placed at the end of each activity block to complete the execution of the block, and a waiting state module is placed in the activity block container holding the activity block, and that the execution control of the activity block container holding the activity block is arranged to generate a second control message in the end state module and to pause the execution in the waiting state module in order to wait for a first control message from the application session management and scheduling manager, wherein the execution of the application session is temporarily interrupted regarding the current activity block container.

* * * * *

UNITED STATES PATENT AND TRADEMARK OFFICE
CERTIFICATE OF CORRECTION

PATENT NO. : 7,444,635 B2  
APPLICATION NO. : 10/601066  
DATED : October 28, 2008  
INVENTOR(S) : Pekka Lehtinen Page 1 of 1

It is certified that error appears in the above-identified patent and that said Letters Patent is hereby corrected as shown below:

In column 19, line 57, after "use" insert --a--.

In column 26, line 25, after "application" delete ",".

Signed and Sealed this

Third Day of March, 2009

JOHN DOLL  
*Acting Director of the United States Patent and Trademark Office*